US007999507B2

(12) United States Patent
Heinzen

(10) Patent No.: US 7,999,507 B2
(45) Date of Patent: Aug. 16, 2011

(54) POWER TOOL HAVING MATING BATTERY TERMINALS

(75) Inventor: William J. Heinzen, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 755 days.

(21) Appl. No.: 11/953,586

(22) Filed: Dec. 10, 2007

(65) Prior Publication Data

US 2009/0145945 A1 Jun. 11, 2009

(51) Int. Cl.
*H01M 10/46* (2006.01)

(52) U.S. Cl. ....................................................... 320/111

(58) Field of Classification Search .................. 320/107, 320/111, 112, 114, 115; 429/96–100; D13/103, D13/107, 108; 307/150
See application file for complete search history.

(56) References Cited

U.S. PATENT DOCUMENTS

| | | | | |
|---|---|---|---|---|
| 4,403,722 | A | 9/1983 | Nikolich | |
| 4,483,473 | A | 11/1984 | Wagdy | |
| 4,483,474 | A | 11/1984 | Nikolich | |
| 4,522,162 | A | 6/1985 | Nikolich | |
| 6,075,341 | A | 6/2000 | White et al. | |
| 6,176,412 | B1 | 1/2001 | Weinger et al. | |
| 6,412,572 | B2 | 7/2002 | Habedank et al. | |
| 6,834,730 | B2 * | 12/2004 | Gass et al. | 173/2 |
| 7,238,443 | B2 | 7/2007 | Sakakibara | |
| 2005/0024021 | A1 * | 2/2005 | Zeiler et al. | 320/134 |
| 2005/0280393 | A1 * | 12/2005 | Feldmann | 320/114 |
| 2006/0087283 | A1 * | 4/2006 | Phillips et al. | 320/114 |
| 2006/0119318 | A1 * | 6/2006 | Serdynski et al. | 320/114 |
| 2006/0267548 | A1 * | 11/2006 | Uehlein-Proctor et al. | 320/107 |
| 2007/0023197 | A1 * | 2/2007 | Nakamura et al. | 173/217 |

FOREIGN PATENT DOCUMENTS

| | | | |
|---|---|---|---|
| DE | 10056370 | B4 | 7/2001 |
| DE | 102006018008 | A1 | 10/2007 |
| EP | 1036636 | B1 | 9/2000 |
| EP | 1683608 | B1 | 7/2006 |
| EP | 1726410 | A3 | 11/2006 |

* cited by examiner

*Primary Examiner* — Edward Tso
(74) *Attorney, Agent, or Firm* — Greer, Burns & Crain, Ltd.

(57) ABSTRACT

A battery for use with, and electronically connected to a power tool having at least one electronic tool contact. The battery includes a battery housing, at least one battery cell disposed in the battery housing, and at least one terminal socket disposed within the battery housing, wherein each terminal socket includes at least one terminal for grippingly engaging an associated one of the at least one tool contact.

10 Claims, 4 Drawing Sheets

POWER TOOL HAVING MATING BATTERY TERMINALS

BACKGROUND OF THE INVENTION

The present invention relates generally to power tools employing batteries to power various tool functions, and more specifically to battery-tool connections.

A preferred type of tool suitable with the present invention is portable, such as a combustion-powered fastener driving tool, also commonly referred to as a combustion tool or combustion nailer. Tools of this kind are manufactured by Illinois Tool Works, Inc. of Glenview, Ill. and are described in commonly assigned patents U.S. Pat. Nos. 4,552,162; 4,483,473; 4,483,474; 4,403,722 and 6,176,412, all of which are incorporated by reference herein.

Generally, combustion tools incorporate a housing enclosing a small internal combustion engine. The engine is powered by a canister of pressurized fuel gas, also called a fuel cell. A powerful, battery-powered electronic power distribution unit produces the spark for ignition, and a fan located in the combustion chamber provides both an efficient combustion within the chamber, and facilitates scavenging, including the exhaust of combustion by-products. The engine includes a reciprocating piston with an elongate, rigid driver blade disposed within a cylinder. Such tools include electronic control systems, spark generators, electric fan motors, and other electronic components, and are powered by batteries.

Conventional power tool batteries are preferably rechargeable and have a pair of electronic contacts positioned such that when the battery is fully inserted into the tool, they are physically connected to a pair of tool contacts, resulting in the battery being electronically connected to the tool.

In addition, conventional power tool batteries are configured for releasably locking into place when electronically connected to a corresponding power tool. The combination of the connection between the electronic contacts and the locking engagement is designed to maintain operation of the tool when subject to environmental stress and operational shock impacts that potentially cause disconnection and/or power disruption. However, conventional battery/tool connections are not always effective. Thus, one design criterion of such battery-tool connection is the ability to maintain the electronic connection while withstanding environmental stress and operational shock impact forces to which such tools are exposed.

Conventional power tool batteries are also configured such that the electronic contacts are adequately spaced apart to prevent an unintended connection between the contacts, resulting in a shorting out of the battery. Thus, another design criterion of the battery is to prevent an inadvertent electronic connection from being formed between the contacts on the battery.

BRIEF SUMMARY OF THE INVENTION

The present power tool having a mating battery features a battery with a pair of female terminals that each grippingly engage a corresponding male tool contact. The battery terminals and associated tool contacts are constructed and arranged such that an electronic connection is established when the battery is fully inserted and releasably locked into the tool. Further, the present terminal and tool connection is configured to withstand environmental stresses such as operational shock impact forces of the tool, threatening an electronic disconnection and/or power disruption. Due to the construction and arrangement of the present battery terminals and associated tool contacts, such forces serve to reinforce the existing electrical connection. The present tool also features a resilient stopper structure that works in combination with a pair of latches on the battery to maintain the desired electronic connection with the battery tool. In addition, the terminals on the battery are located entirely inside a battery housing, providing access to the terminals only through a socket groove. Thus, there is a decreased likelihood of shorting out the battery by accidentally making a connection between the two terminals in the battery by for example, placing the battery in a tool box with other tools made of metal or another conductive material.

More specifically, a power tool for use with, and electronically connected to a battery is provided, the power tool having a tool housing provided with at least one electronic tool contact being generally tab-shaped, the battery having a battery housing, at least one battery cell disposed in the battery housing, and at least one terminal socket disposed within the battery housing, wherein each terminal socket includes at least one terminal for grippingly engaging an associated one of the tool contacts.

DETAILED DESCRIPTION OF THE INVENTION

Figure 1:
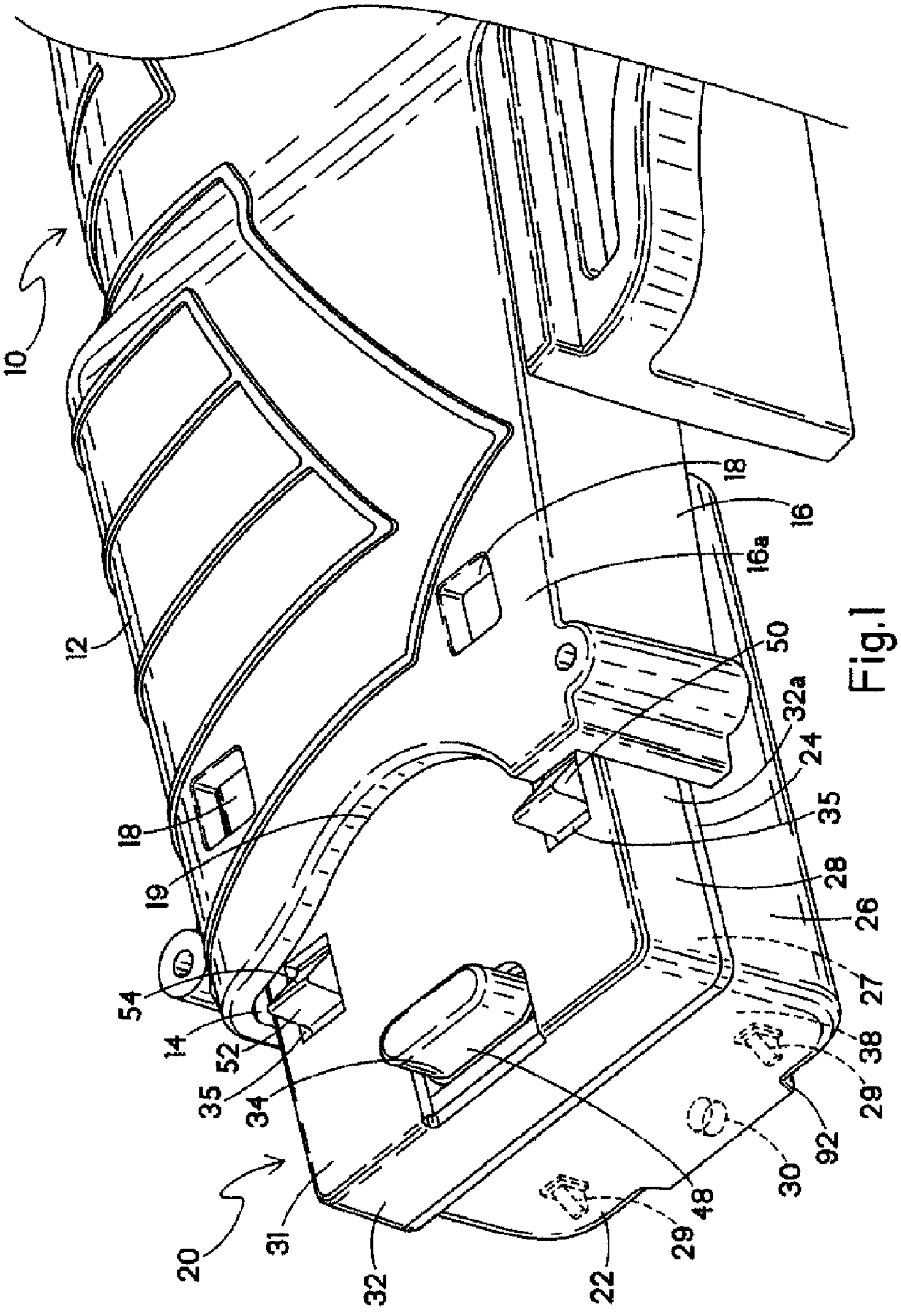
FIG. 1 is a fragmentary side perspective view of a power tool incorporating the present battery.
Figure 2:
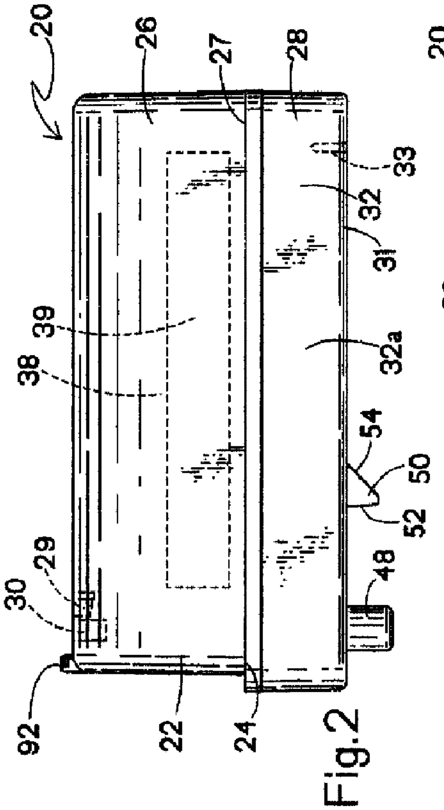
FIG. 2 is a right side view of the present battery.
Figure 3:
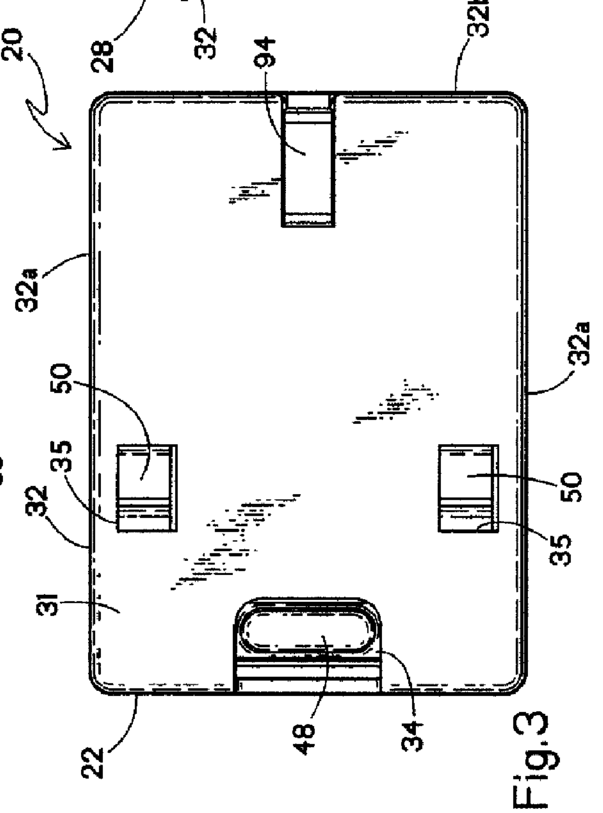
FIG. 3 is a bottom view of the present battery.

Referring now to FIGS. 1-3, a power tool is generally designated 10 and preferably is of the general type described in detail in the patents listed above and incorporated by reference in the present application. A tool housing 12 of the power tool 10 forms a tool chamber 14, the size and shape of the tool chamber being defined by tool housing walls 16. One of the tool housing walls 16*a* has at least one, but preferably two latch receiving openings 18 and a wall recessed area 19.

In the preferred embodiment, the tool chamber 14 receives a battery of the same general shape and size, generally designated 20, having a battery front end 22, a battery housing 24 including a battery housing top portion 26 and a battery housing bottom portion 28. The battery housing top portion 26 is generally box-shaped, defining a battery top portion open end 27. At least one, but preferably two battery cell front ribs 29 are disposed on the battery housing top portion 26 near the battery front end 22 (FIG. 2 shown hidden). A biasing member receiving device 30 (FIG. 1 shown hidden) is disposed in the battery housing top portion 26 adjacent the battery front end 22.

The battery housing bottom portion 28 is generally tray-shaped, having a battery housing bottom surface 31 and a peripheral battery bottom portion sidewall 32. At least one battery cell rear rib 33 is disposed on the battery housing bottom surface 31 opposite the battery front end 22 (FIG. 5).

A button opening 34 and at least one, but preferably two latch openings 35 are disposed on the battery housing bottom surface 31 (FIG. 3). In the preferred embodiment, the latch openings 35 are disposed along opposite elongated battery bottom portion sidewalls 32*a* of the battery housing bottom portion 28 and near the battery front end 22, with the button opening 34 generally centered on the battery housing bottom surface 31 at the battery front end 22. On a shorter battery bottom portion sidewall 32*b* of the battery housing bottom portion 28 opposite the battery front end 22, are two spaced, generally parallel socket grooves 36 (FIG. 4).

Both the battery housing top portion 26 and the battery housing bottom portion 28 are attached to each other using ultrasonic welding or a similar fastening technology including, but not limited to chemical adhesive, threaded fasteners, etc. Once joined, the battery housing portions 26, 28 define an internal battery chamber 38. At least one, but preferably as many as five battery cells 39 are disposed within the battery chamber 38 (FIG. 2 one cell shown hidden). In the preferred embodiment, the battery cells 39 are rechargeable Nickel Metal Hydride (NiMH) batteries, although any similar battery technology that provides power is considered suitable. It is preferred that the five battery cells 39 are disposed within the battery chamber 38 such that the battery cells 39 are associated and held in place by both the battery cell front ribs 29 and the battery cell rear rib 33.

Figure 4:
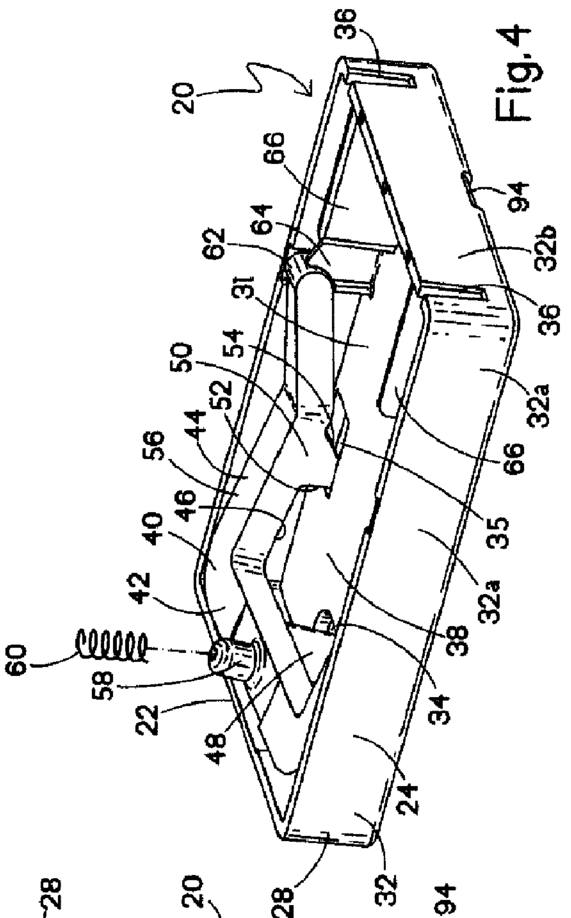
FIG. 4 is a top perspective view of a lower section of the present battery with portions removed for clarity.
Figure 5:
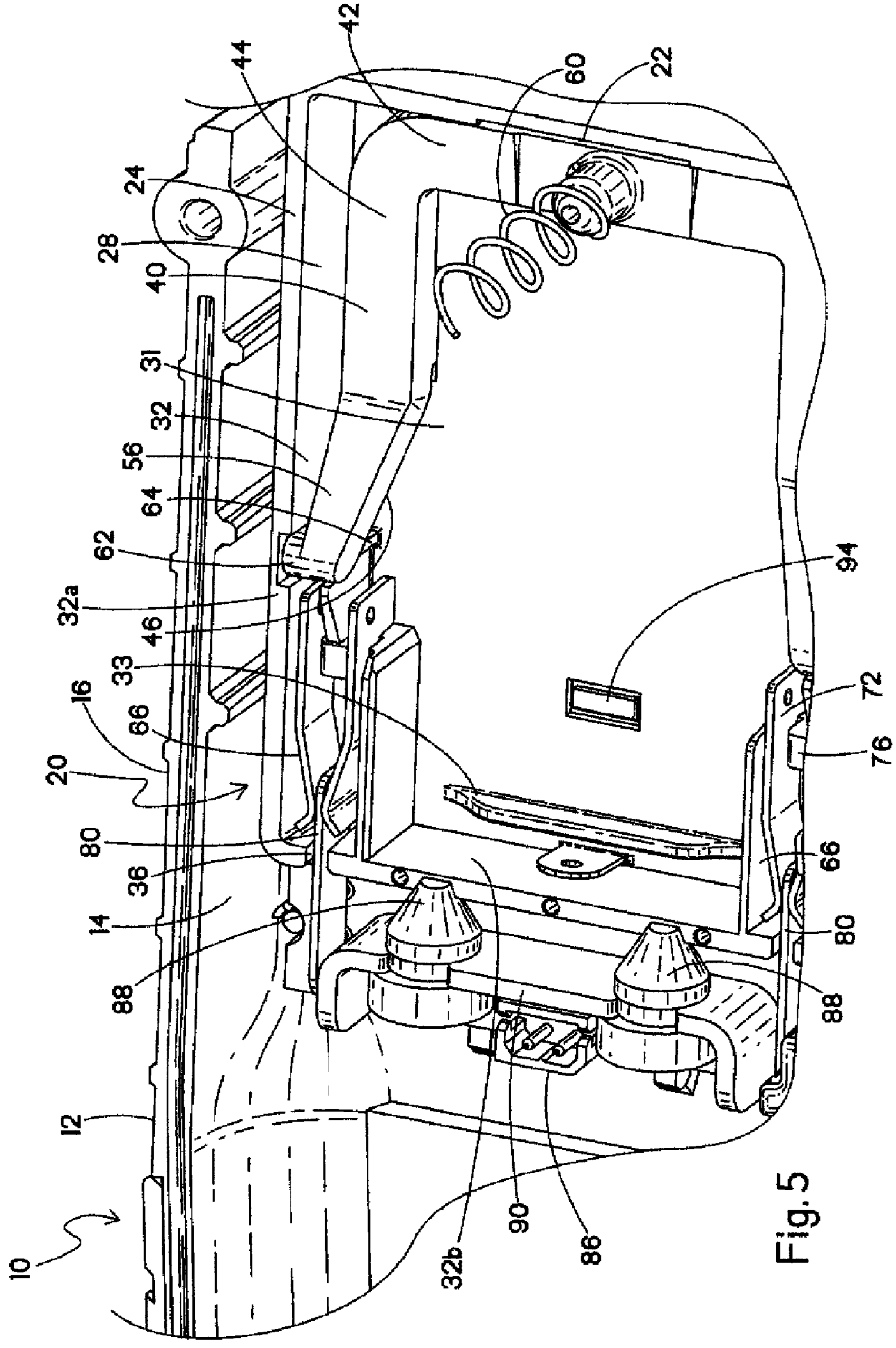
FIG. 5 is a top perspective view of the battery of FIG. 4, slightly rotated, with portions removed for clarity.

Referring now to FIGS. 1 and 4-5, the present battery 20 has a pivoting member 40 in the battery chamber 38, being at least partially enclosed within the battery housing 24. In the preferred embodiment, the pivoting member 40 is generally "U" shaped, having one pivoting member center section 42 located between and generally perpendicular or transverse to two generally parallel pivoting member legs 44. It is noted that other shapes are suitable depending on the application. A co-pending U.S. patent application Ser. No. 11/953,577for Battery For A Power Tool further describes the battery 20 having a pivoting member 40 and is incorporated by reference herein.

The pivoting member 40 has two sides, a pivoting member first side 46 facing an interior surface of the battery housing bottom surface 31 and having an actuator button 48, which preferably is on the pivoting member center section 42. Also, at least one and preferably two latch elements 50, preferably each on the corresponding pivoting member legs 44 are located on the pivoting member first side 46. A latch first side 52 faces the battery front end 22, and has a slope generally perpendicular to the battery housing bottom surface 31. A latch second side 54 is located opposite the first latch side, and has a sloping surface defining an obtuse angle relative to the battery housing bottom surface 31. It is preferred that the actuator button 48 extends farther beyond the button opening 34 than each latch element 50 extends beyond the corresponding latch opening 35. It is also preferred that the actuator button 48 has a surface area greater than a surface area of the latch element 50.

A pivoting member second side 56 has a biasing member formation 58 that in a preferred embodiment is a rounded peg shape. The biasing member formation 58 is associated with a spring 60, which is secured within the battery chamber 38 at the opposite end to the biasing member receiving device 30. It is noted that any biasing device known in the art is considered equivalent to the spring 60.

Referring now to FIGS. 4 and 5, at the end of each pivoting member leg 44 is a pivoting member leg extension 62, each being associated with a corresponding accommodating pivot point or socket 64. At least one, but preferably two spaced terminal sockets 66 are defined on the battery bottom portion 28 in the battery chamber 38 and are each associated with the corresponding pivot point 64 and at the opposite end with the corresponding socket grooves 36. In a preferred embodiment, each terminal socket 66 is aligned with a corresponding pivot point 64 and a corresponding pivoting member leg 44.

Figure 6:
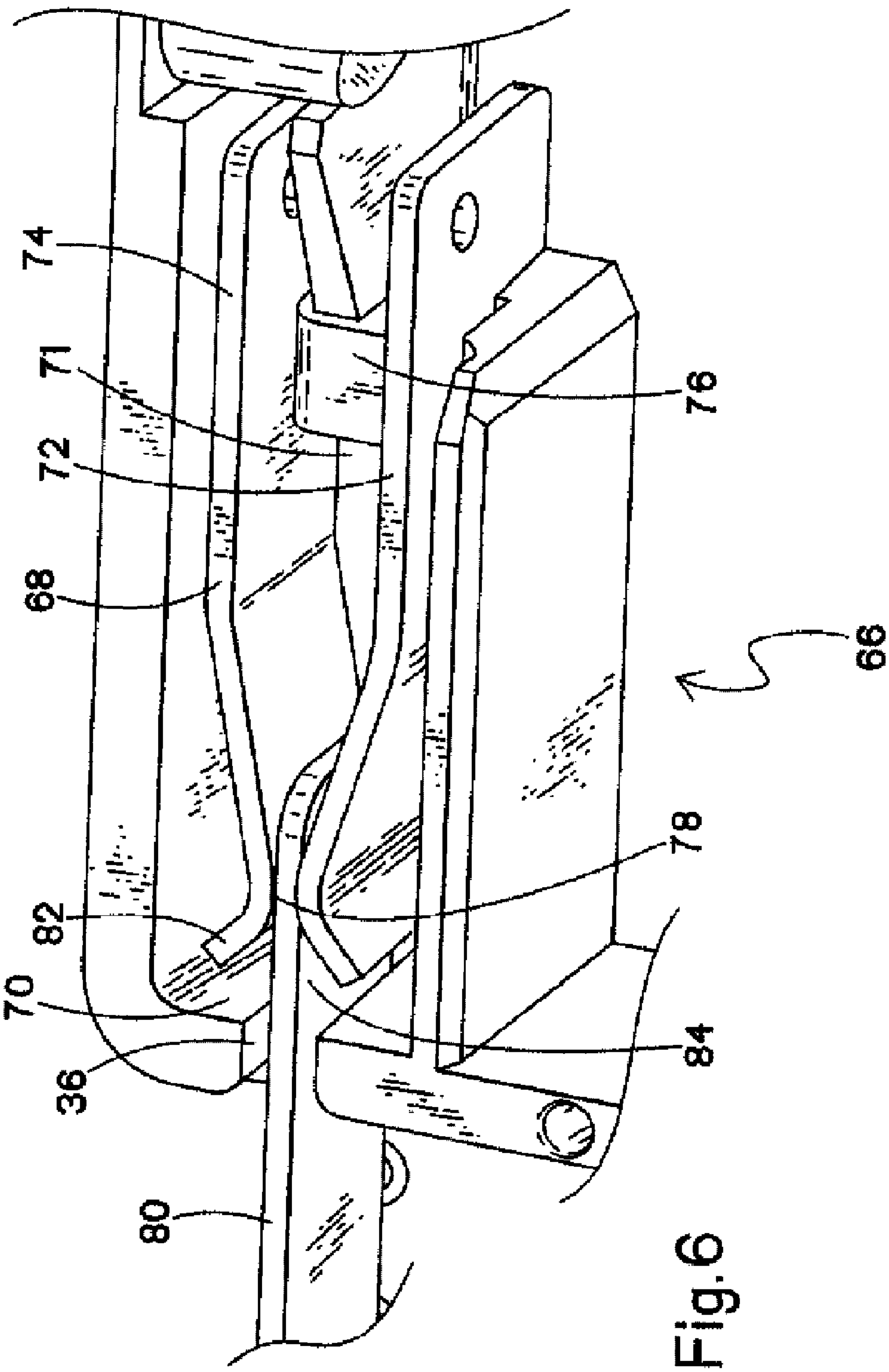
FIG. 6 is an enlarged perspective view of a portion of the terminal socket depicted in FIG. 5.

Referring now to FIG. 6, each terminal socket 66 has at least one terminal 68 having a terminal front end 70 and a terminal floor 71 connecting a a terminal first element 72 and a terminal second element 74. In the preferred embodiment, a plastic locater 76 which is integral with the lower housing 28 is matingly received through the terminal floor 71 between the terminal first element 72 and the terminal second element 74 to assist in properly positioning the terminal 68 within the terminal socket 66. Both terminal elements 72, 74 are biased together at a contact point 78, preferably near the terminal front end 70 such that the terminal elements grippingly engage a tool contact 80. In the preferred embodiment, the terminal elements 72, 74 are blade-shaped, forming a "tulip leaf" configuration, and the tool contact 80 is spade or tab-shaped. It is also preferred that the terminal elements 72, 74 each have diverging flared ends 82, beginning generally at the contact point 78, forming a mouth 84 at the terminal front end 70 for facilitating engagement with the corresponding tool contact 80 such that the tool contact is gripped at the contact point between the terminal elements 72, 74. Thus, each terminal element 72, 74 engages a corresponding side of the generally planar terminal 80.

It will be appreciated that when the terminals 68 engage the corresponding tool contacts 80 through the mouth 84, a plane of the tool contact is perpendicular to a direction of often reciprocating operational shock forces generated by the tool 10. A feature of the configuration of the present terminals 68 is that when such force is exerted, the electronic connection between the tool 10 and the battery 20 is reinforced, as the tool contact 80 is pressed against at least one of the terminal elements 72, 74, depending on the direction of shock impact. Thus, the construction and arrangement of the terminals 68 and the tool contact 80 allow for a more positive and consistent electronic connection.

It is preferred that the first terminal socket 66 is connected, as by soldering one of the elements 72, 74 of the terminal 68 to a positive lead of the battery cells 39 with a lead wire (not shown) and the second terminal socket 66 is similarly connected to a negative lead of the battery cells 39 with a second lead wire (not shown). Further, it is preferred that the tool contact 80 is electronically connected to the tool 10, as by soldering it to a tool power connection 86 mounted on the tool housing 12 (FIG. 5).

Referring now to FIG. 1, when the user inserts the battery 20 into the tool 10, the battery 20 is guided into the tool chamber 14 with the battery housing bottom surface 31 facing the tool housing wall 16*a* and the battery front end 22 being farthest from the tool chamber 14. Due to the biasing force exerted by the spring 60, the latch elements 50 extend though the latch openings 35, causing the latch second side 54 to make contact with an edge of the tool housing wall 16*a*. Initially, this contact prevents the battery 20 from moving further into the tool chamber 14. However, when the user exerts sufficient pressure on the battery 20 in the direction of the tool chamber 14, the sloping nature of the latch second side 54 engages the tool housing wall 16*a*, overcoming the biasing force of the spring 60, forcing the latch element 50 to retract. When the latch element 50 is sufficiently retracted, the battery 20 is able to move further into the tool chamber 14, during which each latch element 50 continues to press against the inside of the tool housing wall 16*a*.

When the battery 20 is fully inserted into the tool chamber 14, the wall recessed area 19 of the tool housing 12 provides a cutout to facilitate user access to the actuator button 48. Further, the latch elements 50 are aligned with the latch receiving openings 18, allowing the latch elements 50 to return from their recessed state and extend through the latch receiving openings by way of the biasing force of the spring 60. As a result, the battery 20 is in a releasably locked position, preventing it from being removed from the tool chamber 14.

It will be appreciated that upon reaching the locked position, the battery 20 is in electrical contact with the tool 10, preferably through the terminal sockets 66, the terminals 68 and the associated socket grooves 36. A co-pending US patent application Ser. No. 11/953,586 for a Power Tool Having a Mating Battery further describes the connection between the tool and the battery and is incorporated by reference herein.

Referring now to FIG. 5, when the battery 20 is completely inserted into the tool chamber 14, at least one, but preferably two resilient, preferably rubber-like stop structures 88 engage the battery. The stop structures or bumpers 88 are preferably secured to a bracket 90, which is mounted on the tool housing 12 opposite the battery bottom portion sidewall **32*b* when the battery 20 is fully inserted. When the battery 20 is in the locked position, the stop structures or bumpers 88 work in combination with the latch elements 50 extending through the corresponding latch-receiving openings 18, to prevent the battery 20 from moving beyond the preferred location and further provide shock absorption when the power tool 10 is in use. It will be appreciated that upon reaching the locked position, the battery 20 is electronically connected to the tool 10, preferably by having the terminals 68 engage the tool contact 80, which extends into the terminal socket 66 through the associated socket grooves 36**.

As noted above, one design criteria of the battery 20 is the ability to withstand environmental stress and operational shock impact forces to which the tool 10 is exposed. The direction of motion resulting from the operational shock impact of the tool 10 generated by fastener driving is generally transverse to the direction of insertion of the battery 20. Therefore, the action of the latch elements 50 is also transverse to the shock impact and as such securely retains the battery 20 within the tool chamber 14. In addition, the latch elements 50 extending through the latch receiving opening 18 work in combination with the resilient stop structures 88 to further secure the battery 20 within the tool chamber 14.

When the battery 20 requires removal, it is disengaged from the locked position by depressing the actuator button 48, causing the pivoting member 40 to rotate about the pivot points 64 such that the latch elements 50 recess. When the latch elements 50 are sufficiently recessed, the latch first side 52 no longer makes contact with the tool housing wall **16*a*, thus allowing the battery 20 to be removed from the tool chamber 14. A finger grip 92 is disposed on the battery housing top portion 26 near the battery front end 22 to assist the user in removing the battery 20**.

It is well known in the art that rechargeable batteries can be charged using stand-alone battery chargers. However, it is also well known in the art that batteries should not be continuously charged once they have reached a certain temperature. Therefore, a temperature sensor (not shown) is disposed on the battery cells 39 as is known in the art. The sensor is connected, as by soldering to a negative lead of the battery cells 39 using a lead wire (not shown) and is also connected to a temperature contact 94 preferably located on the battery housing bottom surface 31. Preferably, the temperature contact 94 is centered on the battery housing bottom surface 31 near the end having the terminal sockets 66. It is preferred that the temperature sensor 94 is connected, as by soldering to a negative lead of the battery cells 39 using a lead wire (not shown).

While a particular embodiment of the present battery for use in a power tool has been described herein, it will be appreciated by those skilled in the art that changes and modifications may be made thereto without departing from the invention in its broader aspects and as set forth in the following claims.

The invention claimed is:

1. A battery for use with, and electronically connected to a power tool having at least one electronic tool contact, the battery comprising:

a battery housing including at least one socket groove;

at least one battery cell disposed in said battery housing; and at least one terminal socket disposed in said battery housing and positioned adjacent to said at least one socket groove, wherein each said terminal socket includes at least one terminal spaced from said at least one socket groove for grippingly engaging an associated one of the at least one tool contact inserted through said at least one socket groove.

2. The battery of claim 1, wherein each said terminal has a terminal first element and a terminal second element, said elements being biased together at a contact point near a terminal front end, whereby each said terminal is configured to mate with a corresponding one of the at least one tool contact.

3. The battery of claim 2 wherein said terminal first element and said terminal second element each have diverging flared ends, beginning generally at said contact point, forming a mouth at said terminal front end for facilitating engagement with a corresponding one of the at least one tool contact.

4. The battery of claim 3 wherein said terminals are constructed and arranged to grippingly engage the at least one tool contact such that the gripping action is perpendicular to a direction of operational shock force generated by the tool.

5. The battery of claim 4, wherein the tool contact is planar, and each said terminal grippingly engages a planar side of the contact.

6. The battery of claim 2 wherein the tool contact is generally tab-shaped, and said terminal first element and said terminal second element are generally blade-shaped, being constructed and arranged for grippingly engaging the tool contact between said elements.

7. The battery of claim 6 wherein each said terminal has a terminal floor joining said first and second terminals, said floor matingly receiving a plastic locator mounted on said battery housing, each said terminal having diverging flared ends, beginning generally at the contact point, forming a mouth at the terminal front end for facilitating engagement with the tool contact.

8. A power tool for use with, and electronically connected to a battery, the power tool comprising:

a tool housing provided with at least one generally tab-shaped electronic tool contact;

said battery having a battery housing defining socket groove, at least one battery cell disposed in said battery housing, and at least one terminal socket disposed in said battery housing and positioned adjacent to said socket groove, wherein each said terminal socket includes at least one terminal spaced from said socket groove for grippingly engaging an associated one of said at least one tool contact; and wherein said at least one tool contact is inserted through said socket groove and mates with said corresponding terminal.

9. The power tool of claim 8 further comprising at least one stopping structure disposed within said tool chamber and being associated with said battery when said battery is in an inserted position.

10. The power tool of claim 9 wherein said tool housing has at least one latch receiving opening and said battery has a biased pivoting member with at least one latch element, each latch element extending through said corresponding latch receiving opening when said battery is in the inserted position, whereby said battery is held in the locked position being secured between said at least one latch element and said at least one stopping structure.

* * * * *